United States Patent [19]

Kago et al.

[11] Patent Number: 4,689,624
[45] Date of Patent: Aug. 25, 1987

[54] VEHICLE SPEEDOMETER

[75] Inventors: Yoshiyuki Kago, Nishio; Hiroyuki Sakakibara, Hekinan, both of Japan

[73] Assignee: Nippon Soken, Inc., Nishio, Japan

[21] Appl. No.: 797,803

[22] Filed: Nov. 13, 1985

[30] Foreign Application Priority Data

Nov. 14, 1984 [JP] Japan .................................. 59-239998

[51] Int. Cl.$^4$ ................................................ G01S 9/66
[52] U.S. Cl. ........................................ 342/117; 367/91
[58] Field of Search ............................. 342/59, 70–72, 342/115, 117, 104, 116; 367/89–91

[56] References Cited

U.S. PATENT DOCUMENTS

| | | | |
|---|---|---|---|
| 3,833,906 | 9/1974 | Augustine | 342/59 |
| 3,859,660 | 1/1975 | Augustine et al. | 342/117 X |
| 3,918,058 | 11/1975 | Noyori et al. | 342/71 |
| 4,050,071 | 9/1977 | Clorfeine | 342/117 |
| 4,107,680 | 8/1978 | Kaplan | 342/115 |
| 4,176,352 | 11/1979 | Tyler | 342/117 X |
| 4,414,548 | 11/1983 | Carpenter et al. | 342/117 |
| 4,506,353 | 3/1985 | Rott et al. | 367/91 |

FOREIGN PATENT DOCUMENTS 0128870 8/1982 Japan .................................. 342/117

*Primary Examiner*—T. H. Tubbesing
*Assistant Examiner*—Bernarr Earl Gregory
*Attorney, Agent, or Firm*—Cushman, Darby & Cushman

[57] ABSTRACT

A vehicle speedometer is disclosed which accurately measures vehicle velocity despite significant vehicle vibration, which causes variation of the angle of incidence of the measuring wave. Two transceivers are mounted on the vehicle, along with means to determine a frequency difference and an angle variation, both being used in an accurate velocity determination.

2 Claims, 4 Drawing Figures

VEHICLE SPEEDOMETER

BACKGROUND OF THE INVENTION

1. Field of the Invention

The present invention relates to vehicle speedometers, and more specifically to a vehicle speedometer wherein a measuring wave is transmitted towards a running road surface and then reflected by the road surface, and the vehicle speed is detected according to the Doppler effect of the reflected wave.

2. Description of the Prior Art

In known Doppler effect speedometers, microwaves are transmitted and received by an antenna installed at a predetermined angle with respect to the road surface. The microwave measuring wave is transmitted from the antenna and reflected at the road surface and the reflected wave is received. Variations in the frequency of the reflected wave relate to the vehicle speed according to the Doppler effect. Such a speedometer is advantageous in that error due to tire slip does not occur in comparison to prior art speedometers wherein vehicle speed is determined by monitoring the rotational speed of the vehicle drive shaft.

In such a Doppler type speedometer, however, the transmitting and receiving antenna moves vertically due to the vehicle vibration or due to variations in the angle of transmitting and receiving antenna with respect to the road surface caused by, for example, pitching vibration or nose-dive vibration. This introduces error in the measuring.

In order to eliminate the error due to the former cause, for example, Japanese examined patent publication No. 26912/1984 is disclosed. In this patent, a microwave transmitting and receiving antenna is installed in a definite angle with respect to the road surface at the front and rear of the vehicle. The received signals of reflected waves at the road surface, obtained by the transmitting and receiving antenna, are inputted to a phase shifter and then synthesized. Thus error caused by the vertical movement of the transmitting and receiving antenna is cancelled. However, no remedy has yet been proposed in order to eliminate error due to the latter cause.

SUMMARY OF THE INVENTION

An object of the invention is to provide a vehicle speedometer utilizing the Doppler effect wherein the vehicle speed can be obtained accurately even when the angle of the measuring wave transmitter/receiver with respect to the running road surface varies due to the vehicle vibration.

In order to attain the above object, a vehicle speedometer of the invention comprises:

(1) a first transmitting and receiving means installed on a vehicle and directed towards a road surface in a predetermined angle $\theta_1$ with respect to the road surface, for transmitting the measuring wave of frequency $f_1$ towards the road surface and receiving the reflected wave from the road surface;

(2) a second transmitting and receiving means installed near the first transmitting and receiving means and directed towards the road surface in a predetermined angle $\theta_2$ with respect to the road surface, for transmitting the measuring wave of frequency $f_2$ towards the road surface and receiving the reflected wave from the road surface;

(3) a frequency difference detecting means for detecting the frequency difference $F_1$ between the measuring wave and the reflected wave in the first transmitting and receiving means, and detecting the frequency difference $F_2$ between the measuring wave and the reflected wave in the second transmitting and receiving means;

(4) an angle variation calculating means, assuming that $K_1$, $K_2$ be correction coefficients for the first and second transmitting and receiving means and that $$\alpha = (F_1/F_2) \cdot (f_2/f_1) \cdot (K_2/K_1),$$

for calculating the variation $\Delta\theta$ of the angle of the first and second transmitting and receiving means with respect to the road surface due to vibration during the vehicle running according to following formula:

$$\Delta\theta = \tan^{-1}\left(\frac{\cos\theta_1 - \alpha\cos\theta_2}{\sin\theta_1 - \alpha\sin\theta_2}\right)$$

(5) a speed calculating means, assuming that c be the velocity of each measuring wave, for calculating the vehicle speed V according to either of following formulae;

$$V = \frac{F_1}{\cos(\theta_1 + \Delta\theta)} \cdot \frac{c}{2f_1} \cdot \frac{1}{K_1}$$

$$V = \frac{F_2}{\cos(\theta_2 + \Delta\theta)} \cdot \frac{c}{2f_2} \cdot \frac{1}{K_2}$$

According to above constitution, even if the angle of the transmitting and receiving means with respect to the road surface varies due to pitching vibration or nose-dive vibration of the vehicle, the vehicle speed can be measured accurately without being affected by the variation.

BRIEF DESCRIPTION OF THE DRAWINGS

FIG. 1 is a schematic side view of a vehicle at front side illustrating arrangement of Doppler sensors;

FIG. 2 is an exploded perspective view illustrating installation structure of the Doppler sensors;

FIG. 3 is a block diagram illustrating constitution od the Doppler sensors and an operation apparatus.

DETAILED DESCRIPTION OF THE EMBODIMENTS

A first embodiment of the invention will be described referring to FIGS. 1 through 3.

Figure 1:
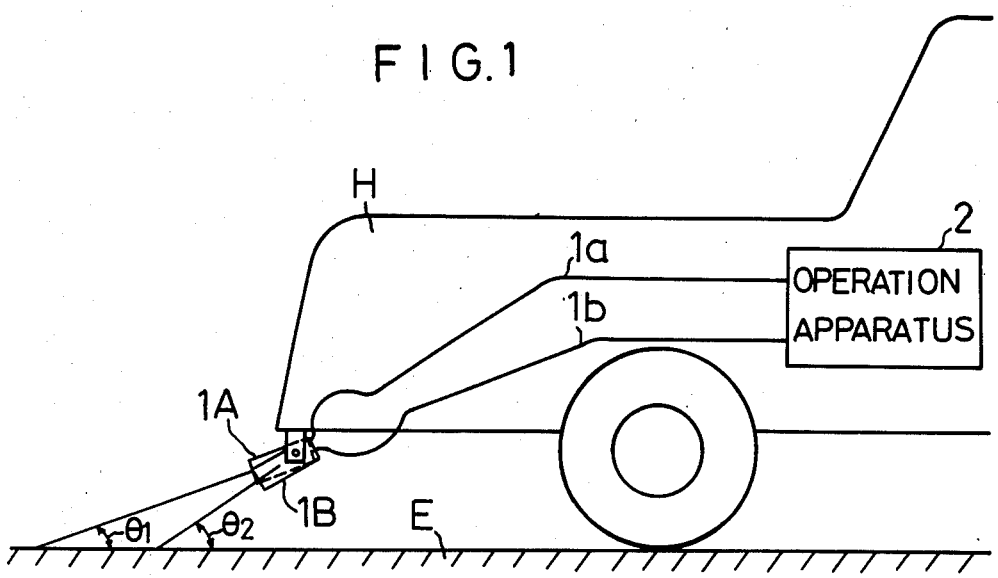
FIGS. 1 through 3 show a first embodiment of the invention.

In FIG. 1, Doppler sensors 1A, 1B, being a first transmitter/receiver and a second transmitter/receiver respectively, are installed to a bottom surface at front end of a vehicle H and directed towards a road surface E in front of the vehicle. Each of the Doppler sensors 1A, 1B has a cylindrical casing with an end surface directed to the road surface E, and an electromagnetic horn antenna as hereinafter described to transmit and receive microwave as measuring wave is installed to the end surface of the casing. Antenna of the Doppler sensors 1A, 1B constitute predetermined angles $\theta_1$, $\theta_2$ respectively between the axial line of each antenna and the road surface E.

Microwaves are transmitted from the Doppler sensors 1A, 1B and reflected on the road surface E, and the reflected waves are returned to the sensors 1A, 1B. The frequency of each reflected wave varies depending on the vehicle speed according to the Doppler effect, and the sensors 1A, 1B generate Doppler signals 1a, 1b each having a frequency equal to the frequency difference between the transmitted microwave and the reflected wave (hereinafter referred to as "Doppler frequency"). The Doppler signals 1a, 1b are transmitted to an operation apparatus 2, which calculates the vehicle speed and displays it according to a procedure as hereinafter described.

Figure 2:
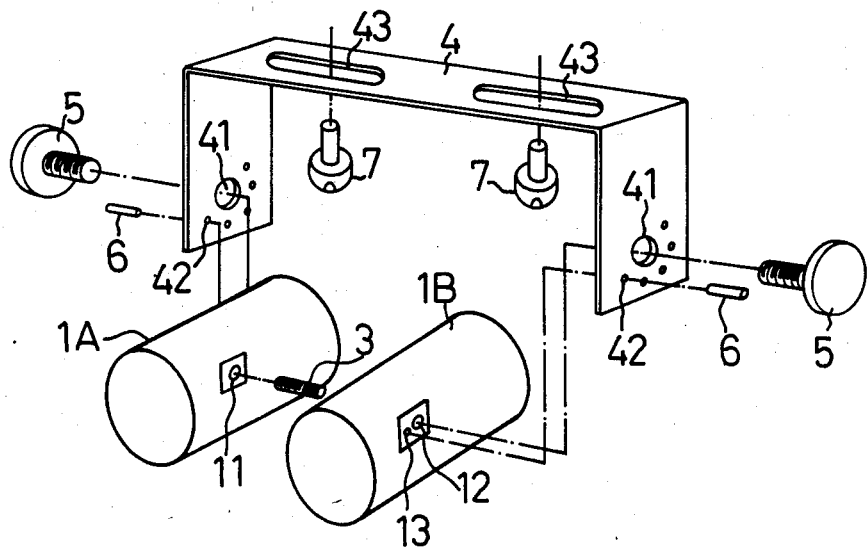

FIG. 2 shows the installation structure of the Doppler sensors 1A, 1B. The sensors 1A, 1B are installed adjacent to each other. Opposed inner side surfaces of the sensors 1A, 1B are provided with tapped holes 11 (Only that of the sensor 1A is shown.), and both ends of thread member 3 are screwed into the tapped holes 11. The sensors 1A, 1B are rotatable relatively about the thread member 3. Outer surfaces of the sensors 1A, 1B are provided with tapped holes 12 (Only that of the sensor 1B as shown.), and bolts 5 inserted through holes 41 formed on both side surfaces of a V-shaped mounting stay 4, are threadedly engaged with the tapped holes 12, fixing the sensor bodies to the stay 4.

A plurality of holes 42 spaced at regular intervals are arranged concentrically about hole 41 and a hole 13 is provided near the tapped hole 12 of each of the Doppler sensors 1A, 1B. The sensors 1A, 1B are rotatable, and when one of the through holes 42 coincides with the hole 13 a pin 6 is inserted to these holes, fixing the sensors 1A, 1B at a required rotational angle. The stay 4 is fixed to a vehicle bumper (not shown) using bolts 7 inserted in oval holes 43 provided on a top plate of the stay 4.

Figure 3:
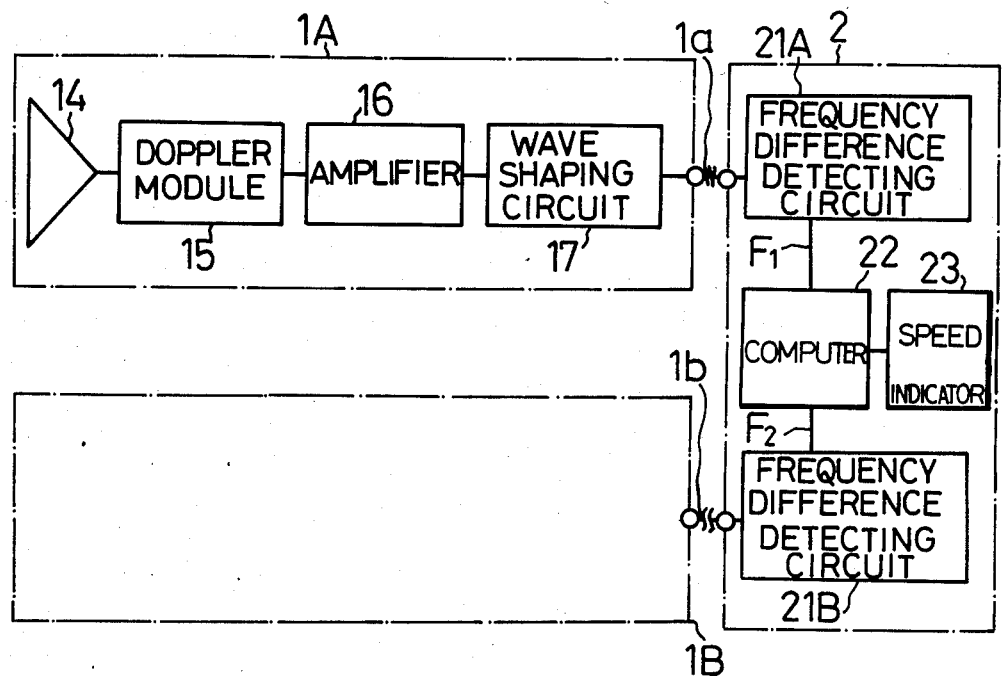

FIG. 3 shows constitution of the Doppler sensors 1A, 1B and operation apparatus 2. The sensors 1A, 1B have the same constitution, and each comprises an electromagnetic horn antenna 14, a Doppler module 15 containing Gunn diode and mixer diode, an amplifier 16 and a wave shaping circuit 17. Microwaves outputted from the Gunn diode within the module 15 are transmitted through the antenna 14 towards the road surface E. Reflected waves at the road surface E are received again by the antenna 14 and are provided to the mixer diode, where the received waves are mixed with the transmitted microwaves and the frequency difference component is taken out. The frequency difference component is shaped into pulse waves by the wave shaping circuit 17, and the pulse waves are outputted as Doppler signals 1a, 1b.

The operation apparatus 2 comprises frequency difference detecting circuits 21A, 21B, a computer 22 and a speed indicator 23. The detecting circuits 21A, 21B receive and count the Doppler signals 1a, 1b, and then output the Doppler frequencies $F_1$, $F_2$.

If the angles $\theta_1$, $\theta_2$ between the Doppler sensors 1A, 1B and the load surface E vary by angle $\Delta\theta$ due to vibration of the vehicle H, the frequencies $F_1$, $F_2$ are given by following formulae (1), (2).

$$F_1 = V \cdot \cos(\theta_1 + \Delta\theta) \cdot \frac{2f_1}{c} \cdot K_1 \tag{1}$$

$$F_2 = V \cdot \cos(\theta_2 + \Delta\theta) \cdot \frac{2f_2}{c} \cdot K_2 \tag{2}$$

wherein V: vehicle speed (m/sec), $f_1$, $f_2$: frequency of microwave transmitted from Doppler sensors 1A, 1B, c: light velosity ($\approx 3 \times 10^8$ m/sec), $K_1$, $K_2$: correction coefficient determined by the microwave frequencies $f_1$, $f_2$ and state of the road surface.

The computer 22 receives the Doppler frequencies $F_1$, $F_2$, and then calculates the vehicle speed V by above formulae (1), (2) being simultaneous equations using the vehicle speed V and the angle variation $\Delta\theta$ as variables.

It follows from the formulae (1), (2) that $$\Delta\theta = \tan^{-1}\left(\frac{\cos\theta_1 - \alpha\cos\theta_2}{\sin\theta_1 - \alpha\sin\theta_2}\right) \tag{3}$$

wherein $$\alpha = (F_1/F_2) \cdot (f_2/f_1) \cdot (K_2/K_1)$$

Angle $\Delta\theta$ calculated by above formula (3) is substituted into formula (1) or formula (2) so as to obtain the vehicle speed V.

The calculated vehicle speed V is displayed on the indicator 23.

Figure 4:
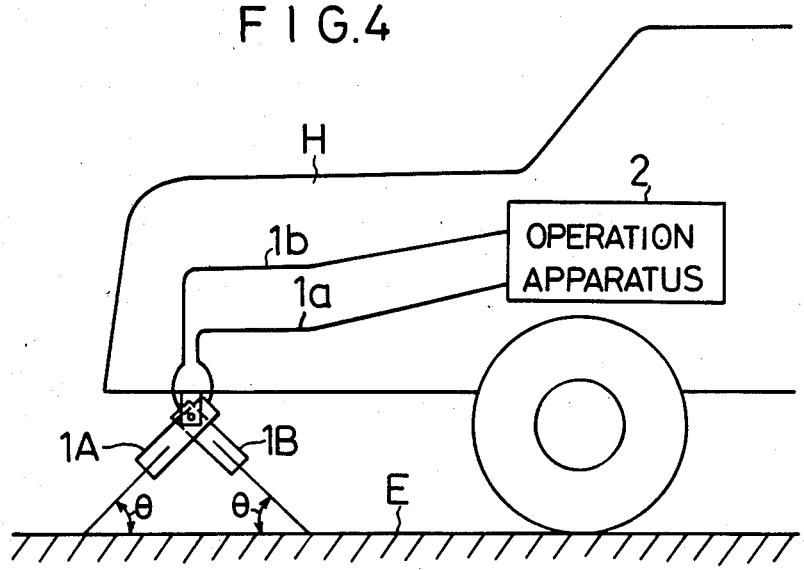
FIG. 4 is a schematic side view of a vehicle at front side illustrating arrangement of Doppler sensors in a second embodiment of the invention.

FIG. 4 shows a second embodiment of the invention. In FIG. 4, the Doppler sensor 1A is directed towards the front of the vehicle and the Doppler sensor 1B is directed towards the rear thereof, and both sensors are positioned at the same angle $\theta$ with respect to the road surface E. The second embodiment is similar to the first embodiment except for the above arrangement.

In the second embodiment, since the Doppler sensors 1A, 1B are directed in reverse directions from each other, even if microwaves transmitted from the sensors 1A, 1B have the same frequency f, interference does not occur and therefore the same correction coefficient K may be used in both measuring systems. If the angle variation in the sensor 1A due to the vehicle vibration is made $\Delta\theta$, that in the sensor 1B becomes $-\Delta\theta$.

Accordingly, formulae (1), (2) in the first embodiment become the following formulae (4), (5) respectively in the second embodiment.

$$F_1 = V \cdot \cos(\theta + \Delta\theta) \cdot \frac{2f}{c} \cdot K \tag{4}$$

$$F_2 = V \cdot \cos(\theta - \Delta\theta) \cdot \frac{2f}{c} \cdot K \tag{5}$$

The computer 22 in the operation apparatus 2 calculates the angle variation $\Delta\theta$ from formulae (4), (5) as shown in following formula (6), and further calculates the vehicle speed V by substituting formula (6) into formula (4) or formula (5).

$$\Delta\theta = \tan^{-1}\left(\frac{1}{\tan\theta} \cdot \frac{F_1 - F_2}{F_1 + F_2}\right) \tag{6}$$

In the second embodiment, similar effects to the first embodiment can be obtained and the calculation to obtain the vehicle speed V becomes more simple.

As above described, the vehicle speedometer according to the invention can measure the vehicle speed accurately even when the angle of the Doppler sensor with respect to the road surface varies due to the vehicle variation.

When a sound wave is used in place of microwaves in the embodiments, of course, similar effects can be obtained.

What is claimed is:

1. A vehicle speedometer comprising:
   (1) a first transmitting and receiving means installed on a vehicle and directed towards a road surface in a predetermined angle $\theta_1$ with respect to the road surface, for transmitting the measuring wave of frequency $f_1$ towards the road surface and receiving the reflected wave from the road surface;
   (2) a second transmitting and receiving means installed near said first transmitting and receiving means and directed towards the road surface in a predetermined angle $\theta_2$ with respect to the road surface, for transmitting the measuring wave of frequency $f_2$ towards the road surface and receiving the reflected wave from the road surface, said angle $\theta_2$ and said frequency $f_2$ being different from said angle $\theta_1$ and said frequency $f_1$, respectively; said first and second transmitting and receiving means being directed in the same general direction;
   (3) a frequency difference detecting means for detecting the frequency difference $F_1$ between the measuring wave and the reflected wave in said first transmitting and receiving means, and detecting the frequency difference $F_2$ between the measuring wave and the reflected wave in said second transmitting and receiving means;
   (4) an angle variation calculating means, assuming that $K_1$, $K_2$ be correction coefficients for said first and second transmitting and receiving means and that $$\alpha = (F_1/F_2) \cdot (f_2/f_1) \cdot (K_2/K_1),$$

for calculating the variation $\Delta\theta$ of the angle of said first and second transmitting and receiving means with respect to the road surface due to vibration during the vehicle running according to following formula:

$$\Delta\theta = \tan^{-1}\left(\frac{\cos\theta_1 - \alpha\cos\theta_2}{\sin\theta_1 - \alpha\sin\theta_2}\right) \text{; and}$$

(5) a speed calculating means, assuming that c be the velocity of each measuring wave, for calculating the vehicle of each measuring wave, for calculating the vehicle speed V according to at least one of the following formulae:

$$V = \frac{F_1}{\cos(\theta_1 + \Delta\theta)} \cdot \frac{c}{2f_1} \cdot \frac{1}{K_1}$$

$$V = \frac{F_2}{\cos(\theta_2 + \Delta\theta)} \cdot \frac{c}{2f_2} \cdot \frac{1}{K_2}$$

2. A vehicle speedometer as set forth in claim 1, wherein at least one of said first transmitting and receiving means and said second transmitting and receiving means includes a Doppler sensor having a cylindrical casing and an electromagnetic horn antenna therein, one end of said casing being fixed to a bottom surface of the vehicle, and said electromagnetic horn antenna being installed in another end of said casing directed towards the road surface.

* * * * *